United States Patent Office 3,422,692
Patented Jan. 21, 1969

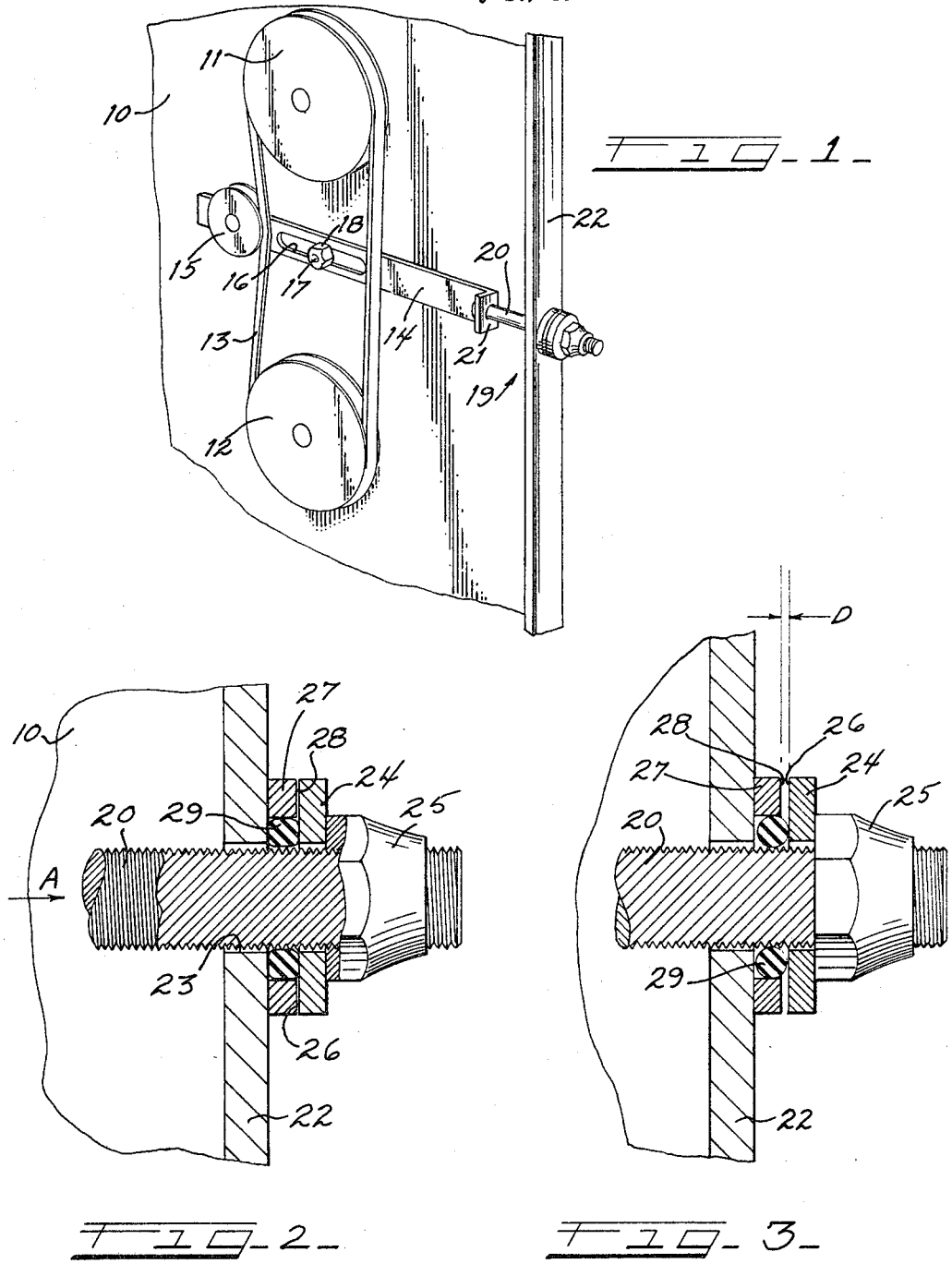

3,422,692
BELT TIGHTENER WITH STRETCH INDICATING MEANS
Robert W. Woodring, La Grange, Ill., assignor to International Harvester Company, Chicago, Ill., a corporation of Delaware
Filed May 10, 1967, Ser. No. 637,600
U.S. Cl. 74—242.1                8 Claims
Int. Cl. F16h 7/12

ABSTRACT OF THE DISCLOSURE

A belt tightener assembly engaging a drive belt trained around a pair of spaced pulleys. A combined indicia and loading means interconnects the belt tightener assembly with a fixed support for preloading the belt tightener assembly with respect to the support and providing a visual indication of the tightness of the drive belt.

Background of the invention

Belt tensioning devices have been developed for maintaining tension on a drive belt within a predetermined range along with means providing a visual indication or reading of the tension. Such devices are characteristically expensive and are economically suitable only for use in conjunction with relatively sophisticated equipment in which the tension of the drive belt must be constantly maintained within critical limits. It follows that such devices are overdesigned and thus too expensive for use with drive arrangements having drive belts whose working tension need not be constantly maintained within critical limits.

In the latter simplified arrangements an idler pulley is sidably connected to a supporting structure such that the pulley may be adjustably fixed against the drive belt to tighten the same to prevent slipping. Eventual stretching of the belt is normally checked by pressing against the belt to determine whether it can be moved beyond a specified distance. Such method is inaccurate at best and usually results in the idler pulley being repositioned to retension the belt according to the judgment and experience of the operator rather than in accordance with optimum requirements.

Summary of the invention

With the foregoing in mind it is accordingly an object of the invention to provide a belt tightener device having indicating means whereby one may be visual inspection observe whether a belt has stretched during prolonged usage.

More particularly it is an object to provide a device according to the preceding object which is simple in construction, low in cost and enables accurate retensioning of the belt by unskilled personnel.

Briefly these and many other objects and advantages of the invention are attained by providing an assembly for indicating stretching of the drive belt engageable by a movable idler. The assembly includes combined indicia and loading means preloading the idler with respect to an included fixed support and including means reflective of the position of the idler with respect to the support. The loading means includes a yieldable preset-load reaction member interposed between the support and the last mentioned means for moving the idler a discernible distance in response to the loading of the belt against the idler being below the preset load, or in other words, if the belt stretches.

Brief description of the drawings

FIGURE 1 is a fragmentary perspective view of the belt tightener assembly of the invention;

FIGURE 2 is a fragmentary cross-sectional view taken in the direction of arrow 2 of FIGURE 1 illustrating the indicia and loading means of the invention in a preset-load position; and, FIGURE 3 is a cross-sectional view similar to FIGURE 2 illustrating the indicia and loading means in a position indicating stretching of the drive belt of FIGURE 1.

Description of the preferred embodiment

Referring first to FIGURE 1 there is shown a portion of a frame 10 of a machine or the like having a pair of spaced pulleys 11 and 12. A flexible drive belt 13 of the V-type for example is trained about the pulleys 11 and 12 to provide a driving interconnection therebetween.

In accordance with common practice the belt 13 is somewhat loosely trained about the pulleys requiring means for tensioning the belt to prevent slipping of the same on the pulleys. Toward that end there is provided an idler pulley assembly including an elongated plate or bar 14 mounting an idler pulley 15 for engaging the belt 13 as shown.

The invention includes mounting means for adjustably fixing the idler pulley assembly on the frame 10 to stretch the belt 13 to a working tension. An elongated opening or slot 16 is defined through the bar 14 receiving a threaded bolt 17 rigidly mounted on the frame 10. A nut 18 is threadedly received on the bolt 17 for locking the bar 14 in the desired position.

In accordance with the invention, means are provided whereby one may be visual inspection determine whether the belt 13 has stretched after prolonged usage. Toward that end the invention includes combined indicia and loading means shown generally at 19 and including an elongated externally-threaded bolt 20 coupled to a flange 21 formed integrally with the end of the bar 14. The bolt 20 extends through a support member 22 fixed with respect to the frame 10. As more clearly shown in FIGURE 2, an opening 23 is defined through the support member 22 for freely receiving the bolt 20. An annulus in the form of a washer 24 is mounted about the bolt 20 in abutting relation with a nut 25 threadedly mounted on the bolt 20. The washer 24 includes an annular face 26 for purposes to be described.

An annular member in the form of a washer 27 is rigidly secured to the support member 22 surrounding the opening 23 and includes an annular reference surface 28 opposing the face 26 of the washer 24. An O-ring 29 of resilient elastomeric material is received about the bolt 20 interposed between the support 22 and washer 24 and constitutes a reaction member subject to preset loading for purposes to be described.

In operation, the nut 18 is loosened and the bar 14 and idler pulley 15 are moved toward the right as viewed in FIGURE 1 to move the pulley 15 into engagement with the belt 13 to stretch the same to a working tension. At the same time the nut 25 is turned on the bolt 20 to move the washer 24 toward the washer 27 to thus compress and preload the O-ring 29. The relative axial thicknesses of the washer 27 and O-ring 29, together with the resilient characteristics of the elastomeric material of the O-ring, are selected to provide the desired amount of preloading when the reference surface 28 and face 26 are in contact with each other. The nut 18 is then tightened to hold the idler pulley in the working position.

When it is desired to check whether the belt has stretched after usage, the nut 18 is loosened to free the idler pulley assembly with respect to the frame 10. If the belt has not stretched, the idler pulley assembly will not move from its original position. However, if the belt has stretched, the idler pulley assembly will be free to move to the right due to the slack in the belt. In other words, the loading of the belt against the idler pulley will be reduced. Under these conditions the preloaded O-ring 29 is free to expand creating an axially directed force against the washer 24 to move it, the nut 25, and bolt 20 in the direction of arrow A with respect to the fixed support 22. Since the washer 27 is fixed to the support, a gap D will appear between reference surface 28 and face 26 as shown in FIGURE 3. Accordingly a clear indication is given that the belt has stretched requiring retensioning of the same. The nut 25 is then turned to again move the washers into contact with each other to preload the O-ring, along with repositioning the idler pulley assembly to retension the belt. The nut 18 is then retightened to hold the idler pulley in working position.

In order to prevent any possibility of the O-ring 29 taking on a permanent set in its preloaded configuration, the adjustment nut 25 may be rotated to permit the washer 28 to move to the right. Accordingly the O-ring 29 will remain in its unloaded configuration until such time as the O-ring has to be compressed to permit the invention to operate as above described.

From the foregoing it will be appreciated that the invention embodies a simplified construction of relatively low cost while providing a readily discernible indication of belt stretching.

Various changes falling within the scope of the invention will occur to those skilled in the art. The belt tightener assembly is therefore not to be thought of as limited to the specific embodiment set forth.

What is claimed is:

1. An assembly for indicating stretching of a drive belt trained about a pair of spaced pulleys, said assembly comprising in combination: an idler movable into tightening position relative to said belt; and combined indicia and loading means loading said idler and comprising a support having a reference surface, means reflective of the position of said idler with respect to said surface, yieldable preset-load reaction means interposed between said support and said last mentioned means and the latter having a face opposing said surface defining a gap therewith attendant the belt-loading imposed upon said idler being below said preset-load; and adjustment means for moving said face into engagement with said reference surface to preload said interposed reaction means to a predetermined value.

2. The subject matter of claim 1, in which said reaction means comprises a body of resilient elastomeric material.

3. An apparatus for indicating stretching of a drive belt trained about a pair of spaced pulleys, said apparatus comprising: an idler pulley assembly for engaging said belt; frame means for mounting said pulley assembly; mounting means for adjustably fixing said pulley assembly on said frame means in a first position to stretch said belt to a working tension; and combined indicia and loading means loading said pulley assembly and including a support, face means movable with said pulley assembly and engageable with said support, and yieldable reaction means interposed between said support and said face means for providing discernible spacing therebetween upon freeing said mounting means permitting said pulley assembly to move from said first position in response to stretching of said belt beyond said working tension.

4. The subject matter of claim 3, in which said indicia and loading means further includes adjustment means for moving said face means into engagement with said support thereby preloading said interposed reaction means to a predetermined value.

5. The subject matter of claim 3, in which said reaction means comprises a resilient body of elastomeric material.

6. An apparatus for indicating stretching of a drive belt trained about a pair of spaced pulleys, said apparatus comprising: an idler pulley assembly for engaging said belt; frame means for mounting said pulley assembly; mounting means for adjustably fixing said pulley assembly on said frame means in a first position to stretch said belt to a working tension; and combined indicia and loading means loading said pulley assembly and including a support having an opening defined therethrough, an annular member secured on said support surrounding said opening and having a reference surface, an elongated element coupled to said pulley assembly and extending movably through said opening, an annulus carried on said elongated element and having a face engaging said reference surface, an annular yieldable reaction means surrounding said elongated element and interposed between said support and said annulus for providing a discernible gap between said reference surface and said face upon freeing said mounting means permitting said pulley assembly to move from said first position in response to stretching of said belt beyond said working tension.

7. The subject matter of claim 6, in which said reaction means comprises a resilient body of elastomeric material.

8. An apparatus for indicating stretching of a drive belt trained about a pair of spaced pulleys, said apparatus comprising: an idler movable in tightening position relative to said belt; a fixed support having a reference surface; a member movable with said idler and having a reference face engageable with said surface; and yieldable preset-load reaction means interposed between said support and said member for moving said face away from said surface to provide a discernible gap therebetween in response to stretching of said belt.

References Cited

UNITED STATES PATENTS

| 1,374,643 | 4/1921 | Fischbach | 74—242.11 |
| 2,914,951 | 12/1959 | Digby. | |
| 2,985,027 | 5/1961 | Murray | 74—242.1 |
| 3,325,095 | 6/1967 | Mueller et al. | 74—242.8 XR |

FRED C. MATTERN, Jr., *Primary Examiner.*

JAMES A. WONG, *Assistant Examiner.*